(No Model.)

A. B. CONDE.
CULINARY VESSEL.

No. 383,943. Patented June 5, 1888.

Witnesses:
S. B. Bruver,
H. V. Scattergood.

Inventor:
Alonzo B. Conde
by William N. Low,
Attorney.

UNITED STATES PATENT OFFICE.

ALONZO B. CONDE, OF ALBANY, NEW YORK.

CULINARY VESSEL.

SPECIFICATION forming part of Letters Patent No. 383,943, dated June 5, 1888.

Application filed November 25, 1887. Serial No. 256,081. (No model.)

*To all whom it may concern:*

Be it known that I, ALONZO B. CONDE, of the city and county of Albany, in the State of New York, have invented new and useful Improvements in Culinary Vessels, of which the following is a specification.

My invention relates to improvements in culinary vessels; and it consists of the novel features hereinafter described and claimed.

The object of my invention is to provide a culinary vessel with a simple and inexpensive attachment by which said vessel can be tilted when required, and which will secure the cover of said vessel in place when the vessel is in a tilted position. This object I attain by the means illustrated in the accompanying drawings, which are herein referred to and form part of this specification, and in which—

Figure 1:
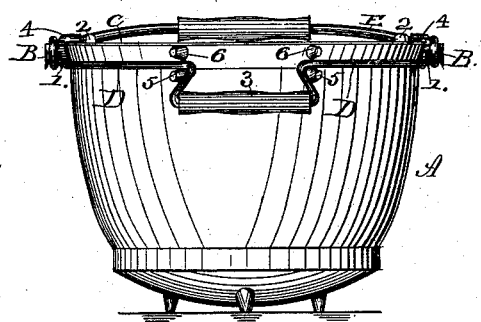
Figure 2:
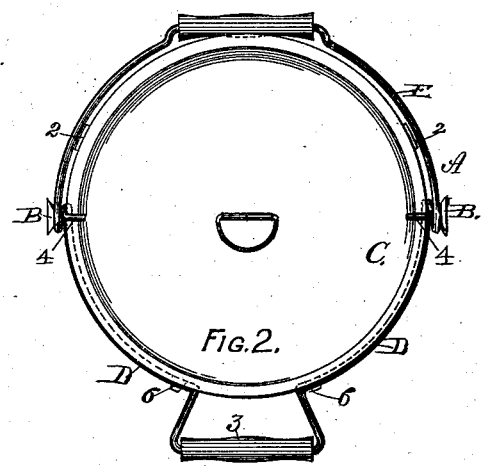
Figure 3:
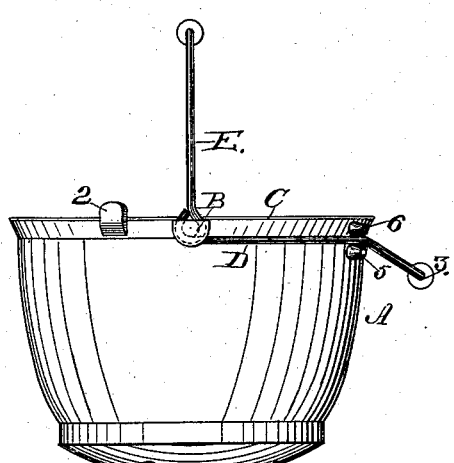
Figure 4:
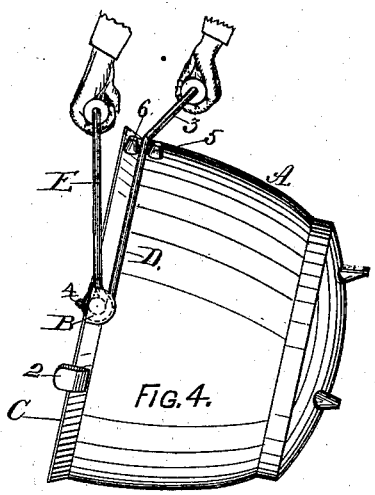
Figure 5:
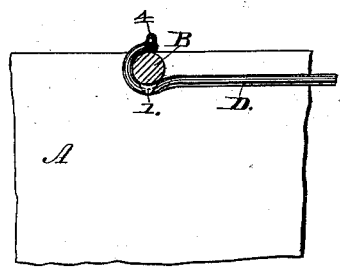
Figure 6:
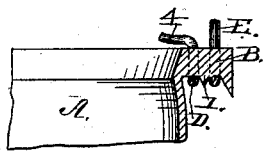

Figure 1 is a rear elevation of an ordinary form of kettle provided with my improvements. Figs. 2 and 3 are respectively a plan view and a side elevation of the same. Fig. 4 is a side elevation of the same in a tilted position, showing the manner of draining water therefrom. Fig. 5 is an enlarged transverse section of one of the trunnions of said kettle at the line X X on Fig. 6, and Fig. 6 is an enlarged longitudinal section of said trunnion at the line Y Y on Fig. 5.

In the drawings, A indicates a culinary vessel, which, instead of the kettle form shown, may be of any form that is suited for culinary purposes. Said vessel is provided with oppositely-located radial trunnions B, for receiving the bails by which the vessel is managed. Each of said trunnions is preferably divided by a transverse rib, 1, into two distinct seats, so that the two bails with which the vessel is provided will be held apart and prevented from interfering with each other. On the upper edge of the vessel stops 2 are formed for the purpose of centralizing the cover C and for preventing the latter from slipping out of its place when the vessel is in the tilted position shown in Fig. 4.

D is a stationary bail, preferably made of wire and having at or near its middle a looped handle, 3, by which the vessel can be tilted when required. Said stationary bail should be fitted snugly around the body of the vessel, and each end of said bail, after passing partially around its appropriate trunnion B, is bent inwardly over the upper edge of the vessel to form retainers 4, by which the cover C will be held down to its place on the top of the vessel. When the form of the vessel requires, supporting-stops 5 should be formed on the rearmost side of said vessel for the purpose of preventing the stationary bail from dropping down from its proper place, and under like conditions check-stops 6 may be formed to engage with the upper side of said stationary bail for the purpose of preventing it from being raised up out of its place; but under ordinary circumstances I prefer to dispense with said stops, as the form of the vessel will usually be sufficient to retain the stationary bail in its required place.

E is a movable bail, like those commonly used on culinary vessels, fitted to swing on the trunnions B at the outer side of the stationary bail D.

The cover C is fixed in place on the top of the vessel A by sliding it under the retainers 4, moving it from the rearmost toward the foremost side of the vessel until it bears against the stops 2.

Water or other liquids in a heated condition can be safely drained from the vessel A while the cover C is retained in place by lifting the vessel with one hand hold of the movable bail E and the other hand hold of the looped handle 3 of the stationary bail D, and then tilting the vessel on its trunnions B, as shown in Fig. 4. The cover C fits the top of the vessel sufficiently close to prevent quite small particles from passing through the joint, but not close enough to prevent any liquid from passing therethrough.

I claim as my invention—

1. A culinary vessel provided with a movable bail and a stationary bail, as herein described, said stationary bail being fitted to bear snugly around one side of said vessel and having its ends bent inwardly to form retainers for holding the cover on said vessel, as and for the purpose herein specified.

2. The combination of a culinary vessel provided with supporting-stops 5 and check-stops 6, a stationary bail retained in position by said stops and having its ends turned inwardly over the upper edge of said vessel to form retainers for holding the cover in place, and a movable bail fitted to swing on the trunnions of said vessel, as and for the purpose specified.

ALONZO B. CONDE.

Witnesses:
  WM. H. LOW,
  S. B. BREWER.